United States Patent [19]

Kershner

[11] Patent Number: 5,270,440

[45] Date of Patent: Dec. 14, 1993

[54] PROCESS FOR PREPARING POLYKETONE USING BIS(DIPHENYLPHOSPHINO) OXAALKANE COMPOUND

[75] Inventor: David L. Kershner, Bronxville, N.Y.

[73] Assignee: Akzo nv, Arnhem, Netherlands

[21] Appl. No.: 759,269

[22] Filed: Sep. 13, 1991

Related U.S. Application Data

[63] Continuation-in-part of Ser. No. 595,059, Oct. 10, 1990, abandoned.

[51] Int. Cl.$^5$ .............................................. C08G 67/02
[52] U.S. Cl. ................................................... 528/392
[58] Field of Search ......................................... 528/392

[56] References Cited

U.S. PATENT DOCUMENTS 4,818,810 4/1989 Drent ................................. 528/392

Primary Examiner—Harold D. Anderson

Attorney, Agent, or Firm—Richard P. Fennelly; Louis A. Morris

[57] ABSTRACT

Polyketone compositions can be prepared by polymerizing carbon monoxide and at least one ethylenically unsaturated monomer using a catalyst system containing a palladium compound, an anion of a non-hydrohalogenic acid, and a phosphorus compound bidentate ligand, a bis(diphenylphosphino)oxaalkane compound which can have the formulae:

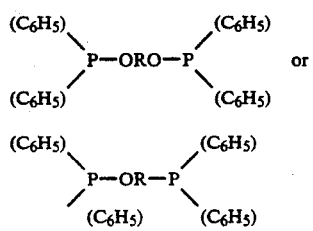

where R is an alkylene bridging group.

6 Claims, No Drawings

PROCESS FOR PREPARING POLYKETONE USING BIS(DIPHENYLPHOSPHINO) OXAALKANE COMPOUND

This is a continuation-in-part of U.S. Ser. No. 595,059, filed Oct. 10, 1990, now abandoned.

BACKGROUND OF THE INVENTION

Polyketone compositions, linear alternating polymers of carbon monoxide and at least one ethylenically unsaturated hydrocarbon, such as ethylene, can be prepared using a catalyst formed from using a palladium compound, an anion of a non-hydrohalogenic acid, and a quaternary phosphonium compound bidentate ligand of the general formula

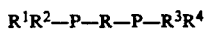

where $R^1$-$R^4$ are organic radicals, such as aryl and R is a divalent bridging group, such as alkylene. Recent examples of disclosures of such processes can be found in U.S. Pat. Nos. 4,804,739 and 4,818,810 which are each incorporated herein by reference.

SUMMARY OF THE INVENTION

The instant process is a catalytic process for making the aforementioned polyketone materials by using a novel phosphorus compound bidentate ligand, a bis(diphenylphosphino)oxaalkane compound, in the previously described catalyst system.

DETAILED DESCRIPTION OF THE INVENTION

The previously mentioned U.S. Patent Nos. 4,804,739 and 4,818,810 are each incorporated herein for their description of the monomers which can be used to make the polyketone materials and the description of the palladium compound and anion of a non-hydrohalogenic acid components of the catalyst. Carbon monoxide is polymerized with at least one ethylenically unsaturated hydrocarbon having, preferably, 2 to 10 carbon atoms with the molar ratio of hydrocarbon or hydrocarbons ranging, preferably, from about 5:1 to about 1:2. The palladium compound can be a palladium salt of a carboxylic acid containing up to about 10 carbon atoms, such as palladium acetate. The anion of the non-hydrohalogenic acid can be from an acid such as para-toluenesulfonic acid. Acetonitrile is used to facilitate dissolution of the phosphonite compound used as the catalyst herein. It is removed from the catalyst system by reduced pressure prior to the polymerization reaction. Generally, the anion can be present at from about 1 to about 100 equivalents per gram atom of palladium and the polymerization process can run at temperatures of from about 20° C. to about 150° C. and pressures of from about 1 bar to 100 bar.

In accordance with a novel aspect of the invention, the catalyst system contains an effective amount for polymerization of a bis(diphenylphosphino)oxaalkane compound of the formula:

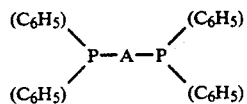

where the bridging group A is of the formula —OR— or —ORO— and where R is straight or branched alkylene having from about 2 to about 4 carbon atoms. Representative R groups include ethylene, propylene, 1,2-dimethylethylene, and the like. The amount of the bis(-diphenylphosphino)oxaalkane compound to use can range from about 1 to about 50 mol per mol of palladium compound. The preferred quantities lie between about 1 and 2 mols per mol of palladium.

The present invention is illustrated by the Examples which follow.

COMPARATIVE EXAMPLE 1

A palladium catalyst was prepared by dissolving 0.45 mmol of palladium acetate, 1.44 mmol of para-toluenesulfonic acid, 2 mmol of acetonitrile and 0.75 mmol of 2-(diphenylphosphino)ethyl methyl ether of the formula $(C_6H_5)_2PCH_2CH_2OCH_3$ in 75 ml of deoxygenated acetone. The solvent was then removed under reduced pressure. The resultant residue was redissolved in 1 liter of deoxygenated acetone, and the solution was charged to a 4 liter autoclave. Next the autoclave was charged at 30° C. with ethylene to a pressure of 34 bar and then with CO until a pressure of 68 bar was attained. The contents of the autoclave were heated to 65° C. After sixteen hours the polymerization was terminated by cooling the contents of the autoclave to room temperature and releasing the pressure. The polymer was recovered by filtering the acetone mixture, and the solid was washed with acetone and dried under a stream of $N_2$ at room temperature. The yield of polymer was 0.60 gm polymer which corresponds to an activity of 13 gm polymer/gm palladium.

COMPARATIVE EXAMPLE 2

A polymerization was carried out in a manner similar to that described in Comparative Example 1 except the catalyst was prepared with 1.0 mmol of palladium acetate 2.1 mmol of para-toluenesulfonic acid, 5 mmol of acetonitrile and 2.0 mmol of 1-(diphenylphosphineoxide)-2-(diphenylphosphino)ethane of the formula $(C_6H_5)_2PCH_2CH_2P(O)(C_6H_5)_2$. The polymerization was carried out at 65° C. for seventeen hours. The yield of polymer was 5.6 gm which corresponds to an activity of 50 gm polymer/gm palladium.

EXAMPLE 3

A polymerization was carried out in a manner similar to that described in Comparative Example 1 except the catalyst was prepared with 0.98 mmol of palladium acetate, 2.4 mmol of para-toluenesulfonic acid, 2 mmol acetonitrile and 1.3 mmol of 1,4-bis(diphenylphosphino)-1,4-dioxabutane of the formula $(C_6H_5)_2POCH_2CH_2OP(C_6H_5)_2$. The contents of the autoclave were allowed to react at 65° C. for twenty hours. The yield of polymer was 17 gm which corresponds to an activity of 160 gm polymer/gm palladium.

EXAMPLE 4

An ethylene/CO copolymer was prepared in a manner similar to that described in Example 3 except the catalyst was prepared using 1.2 mmol of palladium acetate, 2.6 mmol of para-toluenesulfonic acid, 3 mmol of acetonitrile and 2.7 mmol of 1,4-bis(diphenylphosphino)-1,4-dioxabutane. The contents of the autoclave were allowed to react at 65° C. for seventeen hours. The yield of polymer was 22 gm which corresponds to an activity of 170 gm polymer/gm palladium.

EXAMPLE 5

An ethylene/CO polymer was prepared in a manner similar to that described in Example 1 except that it was prepared by dissolving 0.98 mmol of palladium acetate, 2.6 mmol of para-toluenesulfonic acid, 2 mmol of acetonitrile and 1.4 mmol of 1,4-bis(diphenylphosphino)-1,4-dioxa-2,3-dimethylbutane, of the structure $(C_6H_5)_2POCH(CH_3)CH(CH_3)OP(C_6H_5)_2$, in 75 ml of deoxygenated acetone. The contents of the autoclave were allowed to react at 65° C. for seventeen hours. The yield of polymer was 9.25 gm which corresponds to an activity of 89 gm polymer/gm palladium.

EXAMPLE 6

An ethylene/CO polymer was prepared in a manner similar to that of Example 3 except that the catalyst was prepared using 1.0 mmol of palladium acetate, 2.2 mmol of para-toluenesulfonic acid, and 1.2 mmol of 1,4-bis(diphenylphosphino)-1,4-dioxa-2-methylethane of the formula $(C_6H_5)_2POCH(CH_3)CH_2OP(C_6H_5)_2$. The contents of the autoclave were allowed to react at 65° C. for forty-eight hours. The yield of polymer was 16.5 gm which corresponded to an activity of 74 gm polymer/gm palladium.

EXAMPLE 7

An ethylene/CO polymer was prepared in a manner similar to that described in Example 5 except the catalyst was prepared using 1.1 mmol of palladium acetate, 2.2 mmol of para-toluenesulfonic acid, 3 mmol of acetonitrile and 2.8 mmol of 1,3-bis(diphenylphosphino)-1-oxaethane of the formula $(C_6H_5)_2PCH_2CH_2OP(C_6H_5)_2$. The contents of the autoclave were allowed to react at 65° C. for seventeen hours. The yield of polymer was 16 gm which corresponds to an activity of 137 gm polymer/gm palladium.

EXAMPLE 8

A polymer was prepared in a manner similar to that shown in Example 3 except that hydrogen was added to the autoclave prior to carbon monoxide and ethylene addition. Thus, 6.8 bar of hydrogen was added to the autoclave containing the acetone/catalyst solution. The contents of the autoclave were allowed to mix for ten minutes at 30° C. A 1:1 mixture of carbon monoxide:ethylene was then added until a pressure of 68 bar was attained. The contents of the autoclave were heated to 65° C. After twenty-three hours, the contents of the autoclave were collected, the acetone-polymer mixture was suction filtered, and the solid polymer, which was recovered, was washed with acetone. The yield of polymer was 31 gm which corresponds to an activity of 260 gm polymer per gm palladium.

EXAMPLE 9

A polymer was prepared in a manner similar to that described in Example 8 except 13.6 bar of hydrogen was added to the autoclave. A 1:1 mixture of carbon monoxide:ethylene was added until a pressure of 68 bar. The contents of the autoclave were then reacted at 65° C. for eighteen hours. The yield of polymer collected by filtration was 43 gm which corresponds to an activity of 400 gm polymer/gm palladium.

The foregoing Examples are presented for illustrative purposes only and should not, therefore, be construed in a limiting sense. The scope of protection sought is set forth in the claims which follow.

I claim:

1. In a catalytic process for the synthesis of a polyketone by the catalytic polymerization of carbon monoxide and at least one ethylenically unsaturated hydrocarbon in the presence of a catalytically effective amount of a catalyst comprising a palladium compound, an anion of a non-hydrohalogenic acid and a phosphorus compound bidentate ligand, the improvement wherein the bis(diphenylphosphino)oxaalkane compound is the phosphorus compound bidentate ligand, and is of the formula:

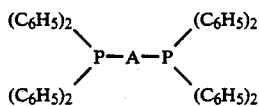

2. A process as claimed in claim 1 wherein the phosphorus compound bidentate ligand is of the formula $(C_6H_5)_2POCH_2CH_2OP(C_6H_5)_2$.

3. A process as claimed in claim 1 wherein the phosphorus compound bidentate ligand is of the formula $(C_6H_5)_2POCH(CH_3)CH(CH_3)OP(C_6H_5)_2$.

4. A process as claimed in claim 1 wherein the phosphorus compound bidentate ligand is of the formula $(C_6H_5)_2POCH(CH_3)CH_2OP(C_6H_5)_2$.

5. A process as claimed in claim 1 wherein R is $C_2$ to $C_4$ straight or branched alkylene.

6. A process as claimed in claim 1 wherein the phosphorus compound bidentate ligand is of the formula $(C_6H_5)_2PCH_2CH_2OP(C_6H_5)_2$.

* * * * *